United States Patent [19]

Faulhaber

[11] Patent Number: 5,575,566

[45] Date of Patent: Nov. 19, 1996

[54] LINEAR MOTION GUIDE COVER BAND

[75] Inventor: Thomas Faulhaber, Bergrheinfeld, Germany

[73] Assignee: Deutsche Star GmbH, Schweinfurt, Germany

[21] Appl. No.: 530,366

[22] PCT Filed: Apr. 7, 1994

[86] PCT No.: PCT/EP94/01080

§ 371 Date: Sep. 25, 1995

§ 102(e) Date: Sep. 25, 1995

[87] PCT Pub. No.: WO94/24445

PCT Pub. Date: Oct. 27, 1994

[30] Foreign Application Priority Data

Apr. 8, 1993 [DE] Germany ............ 43 11 641.8

[51] Int. Cl.$^6$ .................................................. F16C 29/06
[52] U.S. Cl. .................................................. 384/45; 384/15
[58] Field of Search .................................. 384/15, 42, 44, 384/45, 49, 50, 55

[56] References Cited

U.S. PATENT DOCUMENTS

| | | | |
|---|---|---|---|
| 3,785,418 | 1/1974 | Hennig et al. | 384/15 X |
| 3,845,993 | 11/1974 | Schiler | 384/45 |
| 4,552,416 | 11/1985 | Lehmann et al. | 384/45 |
| 4,986,508 | 1/1991 | Osawa et al. | 384/15 X |
| 5,308,167 | 5/1994 | Tsukada | 384/45 |

FOREIGN PATENT DOCUMENTS

| | | |
|---|---|---|
| 0124648 | 11/1984 | European Pat. Off. . |
| 0311895 | 4/1989 | European Pat. Off. . |
| 1600992 | 8/1970 | France . |
| 3812505 | 11/1988 | Germany . |

OTHER PUBLICATIONS

Brochure of INA Lineartechnik (partial, incl pp. 4–5) dated Jun. 4, 1991.
*Lexicon Der Feinwerktechnik* ("Dictionary of Precision Machinery"), Deutsche Verslags–Anstalt Stuttgart (Germany), 1969, p. 374.
Japanese UM Publ. Appln. No. 1–98920, publ. Jul. 8, 1989 (drawings only).
Brochure of Lanz Oensingen AG, Jun., 1991.
Katalog 92, Tehalit (pp. 26 and 27), 1992.
"Der Grosse Häfele", 1971, Nagold, p. 7.32.

*Primary Examiner*—Thomas R. Hannon
*Attorney, Agent, or Firm*—Brumbaugh, Graves, Donohue & Raymond

[57] ABSTRACT

For a linear motion guide (10) having a guide rail (12) and a slide (14) supported on the guide rail (12) by way of rolling or roller elements (26), where the guide rail (12) is provided with coverable through holes (32) for fastening elements (18) for mounting the guide rail (12) on a support, which holes open in a surface (34a) of the guide rail (12) facing away from the support (16) and which are arranged in the region of motion of the slide (14), there is proposed a covering band (40), formed of springy band material and having a center section (42) covering the surface (34a) over its entire width perpendicular to the longitudinal direction of the guide rail, and two edge sections (44a, 44b), parallel to the longitudinal direction of the guide rail and bent off inward, for engagement in an undercut (48) in each of the two side faces (30), following the surface (34a) of the guide rail (12) in the direction of its width, of the guide rail (12) in the edge region between the surface (34a) and the side face (30).

11 Claims, 2 Drawing Sheets

LINEAR MOTION GUIDE COVER BAND

BACKGROUND OF THE INVENTION

The invention concerns a linear motion guide having a guide rail and a slide supported on the guide rail by way of rolling or roller elements, where the guide rail is provided with coverable through holes for fastening elements for mounting of the guide rail on a support, which holes open in a surface of the guide rail facing away from the support and which are arranged in the region of motion of the slide.

Linear motion guides are regularly used for the linear guidance of components with high precision such as, for example, for the guidance of mechanical subassemblies on machine tools or for the motion of measuring heads. Linear motion guides are also used in environments with a high degree of fouling. To prevent the rolling or roller elements arranged in the slide from fouling, which would lead to high wear as well as possibly to the loss of guide precision, steps are taken to prevent the penetration of dirt or dust into the interior of the slide. For this purpose lip seals, which slide along the surface of the guide rails as well as of the side faces of the guide rails, are frequently provided on the two front faces of the slide perpendicular to the direction of travel, in order to wipe particles of dust or dirt from the respective surface.

For fastening the guide rail of a common linear motion guide, the guide rail is provided with through holes for appropriate fastening elements for mounting the guide rail on a support. The through hole may, for example, be recessed for the accommodation of a fastening screw with screw head. Since dust and dirt that may possibly get into the interior of the guide slide when the latter is directly over the hole may accumulate between the top side of the screw head and the surface of the guide rail, it is disclosed in DE 3,812,505 A1 that in a generic linear motion guide the through holes on the surface may be covered, specifically, by means of a striplike plate which is inserted in a longitudinal groove on the top side of the guide rail corresponding to the plate cross section and which is bolted fast to the guide rail by retaining means at either end of the plate. For this, a corresponding fastening screw passes through an associated through hole of the plate before it penetrates into a corresponding thread of the guide rail.

DE 3,812,505 A1 describes as known another type of covering wherein the longitudinal groove is designed continuous and is provided with a profile in order to hold the plate, inserted into the longitudinal groove from one end of the guide rail, in the said longitudinal groove. Here, however, the risk exists that in case of great sliding resistance of the wiping seal the plate may possibly be carried along in the longitudinal direction of the guide rail. In both known linear motion guides, not only is the relatively high structural cost, because of the longitudinal groove to be worked into the guide rail, a disadvantage, but so is the practically unavoidable design of a small step or narrow slot between the longitudinal edges of the plate and the edges between the surface and the grooved side faces. The wiping seal slides along the guide rail at this beveled step or the beveled edges of the slot possibly having a varying slot width, specifically as a rule under relatively high pressure, in order to ensure that the top side of the guide rail, particularly susceptible to fouling, is reliably wiped. Nevertheless, this does not always ensure that dirt particles in the edge region or slot region do not get into the interior of the slide.

SUMMARY OF THE INVENTION

The object of the invention is to provide a linear motion guide of the type mentioned at the beginning which, while simple to produce, reduces the risk of penetration of particles of dust and dirt into the slide.

This object is accomplished in that there is provided a cover band made of springy band material and having a center section covering the surface over its entire width perpendicular to the longitudinal direction of the guide rail and two edge sections, parallel to the longitudinal direction of the guide rail and bent off inward, for engagement in an undercut, in each of the two side faces of the guide rail following the surface of the guide rail in the direction of its width, in the edge region between surface and side face.

According to the invention, the cover band covers the entire top side of the guide rail bearing the surface, so that a continuously smooth flat surface of the guide rail is obtained for the lip seal on the slide, and particles of dust or dirt or even workpiece shavings upon use of the linear motion guide on a processing machine cannot settle on the surface and hence are reliably wiped off by the lip seal. It is of advantage that a longitudinal groove does not have to be worked into the top side of the guide rail. Because of engagement under spring prestress of the edge sections of the band material in the respective undercut on the side of the guide rail, the cover band and guide rail are reliably held together. Assembly is especially facilitated. For this, an edge section of the cover band only has to be inserted into the corresponding undercut in oblique position and the band then tipped toward the top side of the guide rail until the other edge section springs into the corresponding undercut.

In order reliably to provide for sufficient pressure force of the edge sections even with specific manufacturing tolerances, especially in manufacture of the cover band, it is proposed that, for seating on the respective edge section, a contact surface of the undercut form an undercut angle which is greater than the sharp angle formed between the center section and the edge section. Because of this measure, the outer edges of the edge section always lie reliably on the contact surface of the undercut under the desired spring force.

In this connection, it is advantageous that the undercut angle be about 3° to 10°, preferably about 5°, greater than the sharp angle. It has been found to be especially favorable that the sharp angle be about 65° to 75°, preferably about 70°.

In order to facilitate snapping on the cover band, it is proposed that the edge between the surface and the contact surface be rounded.

In a particularly preferred embodiment of the invention, it is provided that the cover band consist of hardened spring band. The hardened spring band is characterized by high wear and temperature resistance. And no relaxation of the spring force need be feared. The possibility also exists of using a very thin spring band having a thickness of 0.1 to 0.2 mm, preferably about 0.15 mm, so that retrofitting a linear motion guide by using the cover band generally requires no special modifications, in particular of the lip seal. With the contact surface, the outer edges of the two edge sections form a step with a step height corresponding to the thickness of the cover band. However, since the step does not lie on the top side of guide rail exposed to dirt, but on the sides of the guide rail and, in addition, is protected in the respective undercut, there is no risk that particles of dust or dirt that may possibly collect here might penetrate into the interior of the slide.

The invention likewise concerns a cover band for a linear motion guide as described above.

BRIEF DESCRIPTION OF THE DRAWINGS

The invention is explained below by a preferred example and with the aid of the drawing, wherein.

DETAILED DESCRIPTION

Figure 4:
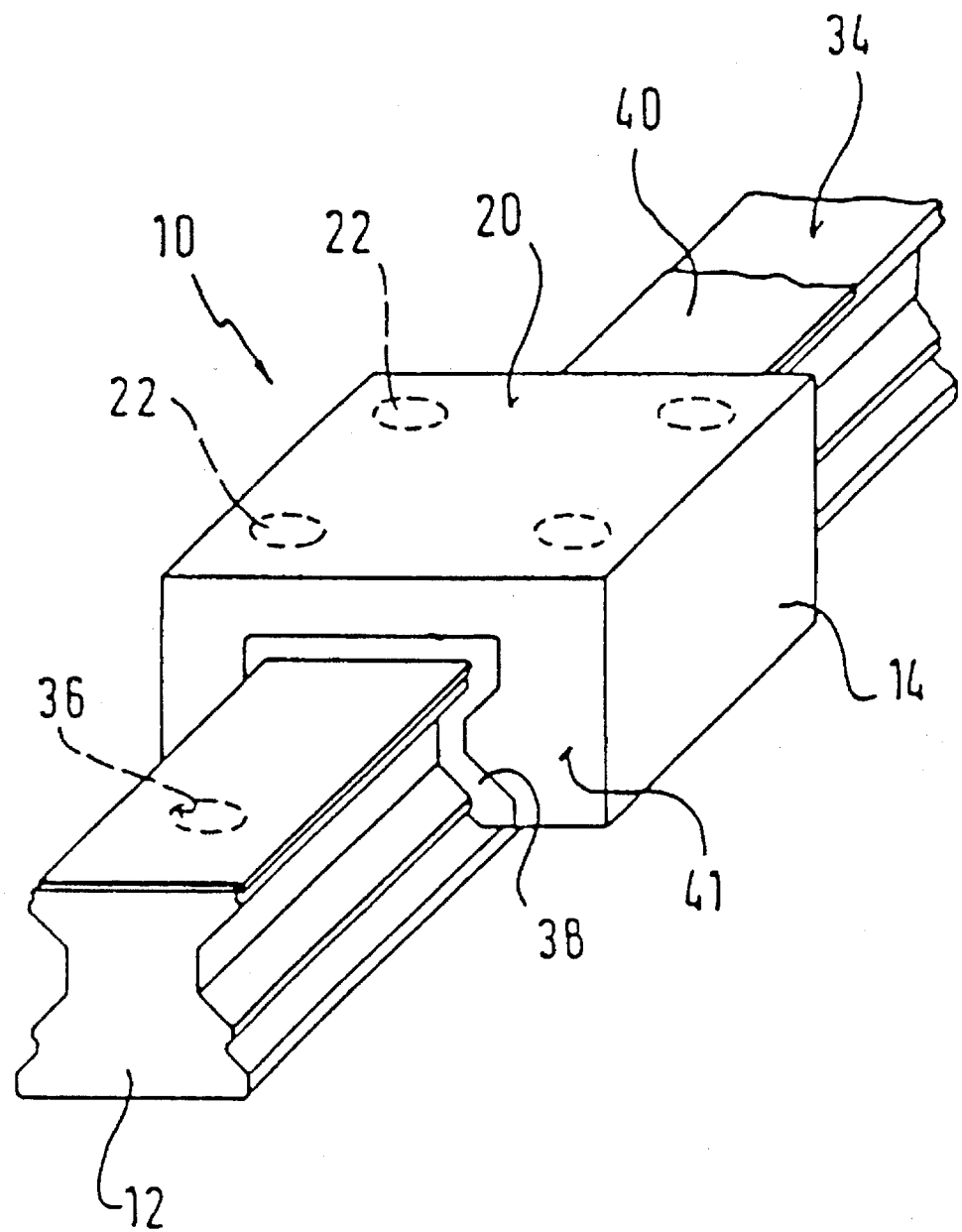
FIG. 4, a simplified general isometric view of a linear motion guide with cover band on the guide rail.

The linear motion guide 10, generally represented in FIG. 4, consists of a guide rail 12 and a slide 14 supported movable along the rail 12. The rail 12 is mountable on a support 16, for example a machine frame, indicated in FIGS. 1 and 2, by means of at least two fastening screws 18 in the region of the two ends of the rail. The part to be moved linearly, for example tool support or measuring instrument head, is mountable on the guide slide 14, for example by means of fastening screws, which are capable of screwing into tapped holes 22 opening on the top side 20 of the slide 14. The slide 14 is supported in the usual fashion by way of rolling or roller elements on the rail 12. In FIG. 2, two closed ball races 24a and 24b are indicated with balls 26, which are supported on two rolling surfaces 28a and 28b, sloped inward in each instance on the two longitudinal sides 30 of the guide rail. The broken lines at the left in FIG. 2 indicate the corresponding shape of the slide. The right-hand half must be imagined to be executed in the same way.

Instead of balls, other rolling members may alternatively be used.

For the accommodation of the fastening screws 18 already mentioned, the guide rail 12 in each instance is provided with a corresponding recessed through hole 32 which extends into the top side 34 of the rail 12 facing the support 16, forming a relatively sharp circular edge 36. Depending upon the type of load and length of the guide rail 12, additional screw fastenings, with corresponding through holes 32 in the rail 12, may alternatively be required between the ends of the guide rail.

The interior I of the slide 14, surrounded by the slide 14, U-shaped in cross section and largely filled by the guide rail 12, is frequently sealed off by a lip seal 38, substantially following the outline of the guide rail 12, on both front faces 41 of the slide 14. This is designed to prevent the penetration of particles of dust or dirt or of workpiece shavings into the interior I and hence into the region of the balls 26. At least in those through holes 32 which are traveled over during operation of the slide 14, there exists the risk that dust, dirt or workpiece shavings collecting in these holes 32 (above the heads 18a of the fastening screws) will penetrate into the interior I of the slide upon travel of the slide. Passage of the edge 36 through the lip seal likewise leads to high wear and tear of the seal.

To remedy this, a cover band 40, consisting of springy band material, namely hardened spring band, is snapped onto the top side 34 of the guide rail 12. For this, the cover band 40 consists of a flat center section 42 having a width b slightly exceeding the corresponding width of the flat surface 34a of the top side 34, as well as of two edge sections 44a and 44b. The edge sections 44a, 44b in each instance are bent off downward and toward one another at a sharp angle α (FIG. 3), which is smaller than 90° and amounts to about 65° to 75°, preferably to about 70°.

Figure 3:
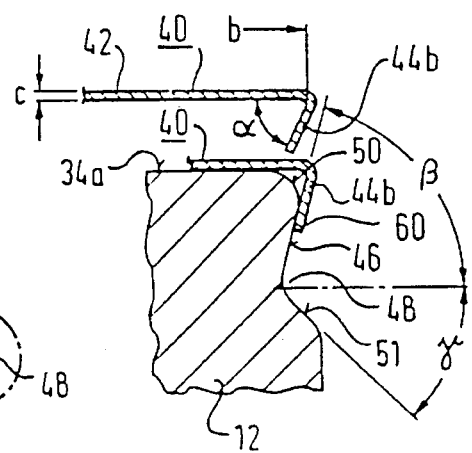
FIG. 3, the detail A in FIG. 1 on an enlarged scale.

In the assembled state according to FIG. 2 and FIG. 3 at the bottom, the respective edge section 44b lies on a contact surface 46 of an undercut 48 underneath the respective side edge 50 of the guide rail 12 between the top side 34 and the longitudinal side 30. The contact surface 46, together with the flat top side 34a, forms an undercut angle β likewise of less than 90°. This angle is about 3° to 10°, preferably about 5° greater than the sharp angle α, i.e., about 75°.

The contact surface 46, in a direction away from the surface 34a, is adjoined by an additional oblique surface 51, which with the contact surface 46 forms an angle exceeding 90° (β+γ), preferably of about 120°. Since the contact surface 46 is designed for the respective edge section 44a or 44b on the longitudinal side 30 of the guide rail 12 inclined generally perpendicular to the support 16 and in addition, because of the angle α of less than 90°, seen from above, inclines downward and inward and hence forms a sort of undercut, no particles of dirt or dust or workpiece shavings are able to settle on the contact surface 46.

Assembly of the cover band 40 can be effected, at least when the guide rail is short in length, by placing the cover band 40 on one end of the rail and slipping it onto the rail with constant engagement of the two edge sections 44a and 44b in the respective undercut 48.

Figure 1:
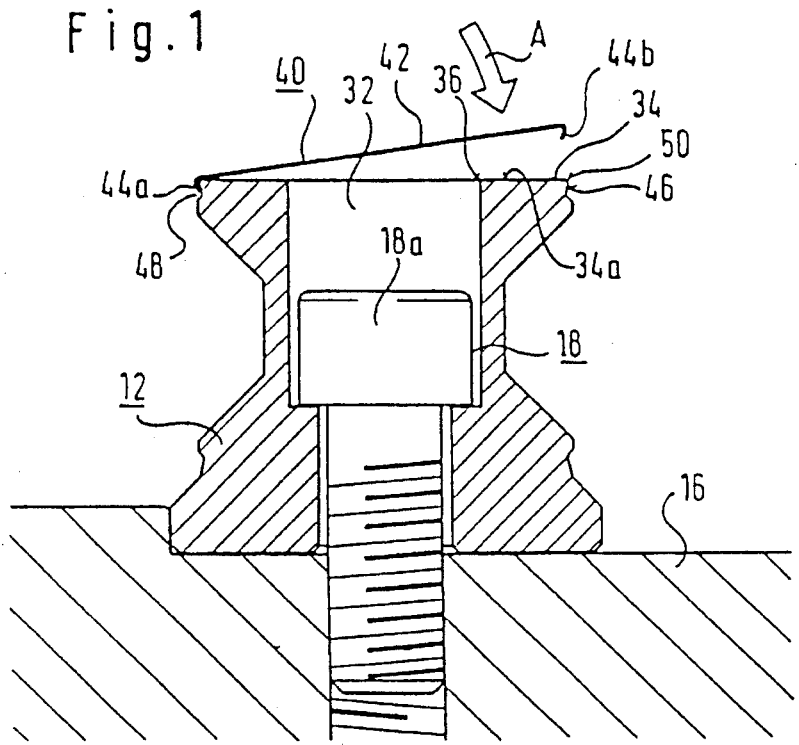
FIG. 1 shows a cross section of a guide rail mounted on a support in the region of a fastening screw, upon assembly of the cover band.
Figure 2:
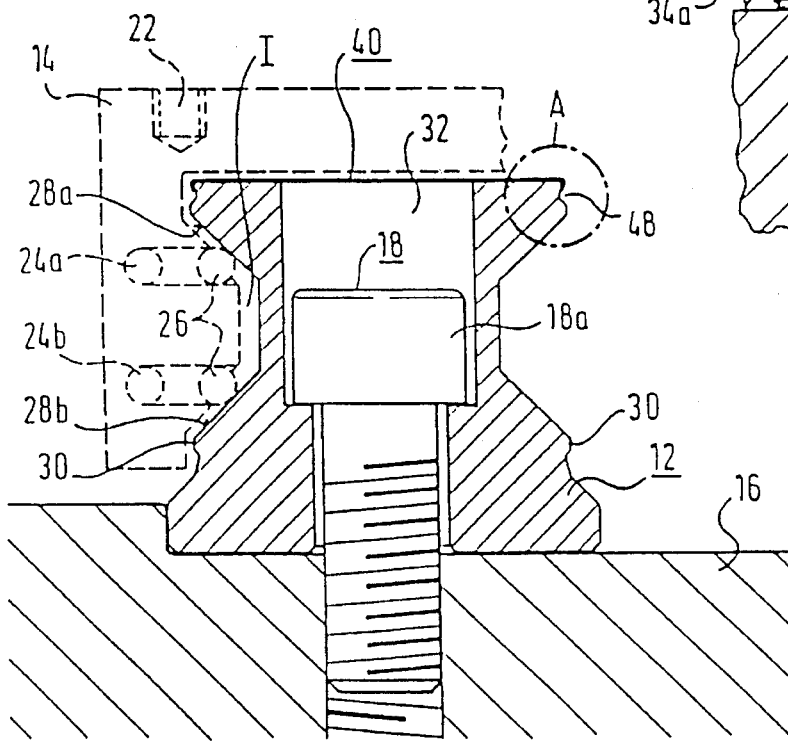
FIG. 2, the arrangement of FIG. 1, after assembly of the cover band.

The manner of assembly as indicated in FIGS. 1 and 2 is especially simple and, in addition, is independent of the length of the guide rail. For assembly, the cover band is placed obliquely on the guide rail 12 and the edge section 44a, for example, at the left in FIGS. 1 and 2, is inserted into the associated undercut 48. The cover band is then tilted down on the top side 34 of the guide rail 12 (arrow A in FIG. 1), until the right edge section 44b snaps into in the corresponding undercut 48. This is facilitated by the relatively strong rounding of the edge 50 between the flat surface 34a and the contact surface 46, represented in FIG. 3. Since the sharp angle α of the as yet unmounted band is smaller than the undercut angle, after assembly of the cover band 40 a springy pressure of the outer edge 60 of the edge section 44b is produced on the contact surface 46, even in case of some production inaccuracies.

The cover band 40 bears lightly, in particular no adjustment of the shape of the lip seal 38 is needed, since the thickness c of the cover band 40 is only 0.1 to 0.2 mm, preferably about 0.15 mm.

I claim:

1. A guide rail cover, comprising:

a center section for covering a top side of a guide rail; and two edge sections extending parallel to a longitudinal direction of the guide rail and bent inward at a sharp angle from the center section for engagement with side faces of the guide rail;

the guide rail cover being composed of a hardened spring material.

2. A guide rail cover according to claim 1, wherein the spring band has a thickness within the range of about 0.1 mm to 0.2 mm.

3. A guide rail cover according to claim 2, wherein the spring band has a thickness of about 0.15 mm.

4. A linear motion guide, comprising:

a guide rail having a longitudinal direction, a top side and two side faces, each side face having an undercut in the transverse direction;

a slide substantially U-shaped in cross section;

a plurality of rolling elements provided on the slide for supporting the slide on the guide rail for movement longitudinally therealong;

at least one opening through the top side of the guide rail within the range of longitudinal movement of the slide for receipt of a fastening member to secure the guide rail to a support;

a cover band of springy band material, the cover band having a center section for covering the top side of the guide rail within the range of longitudinal movement of the slide and two edge sections parallel to the longitudinal direction of the guide rail and bent inward in the transverse direction for engagement with the side face undercuts of the guide rail; and a contact surface of each guide rail undercut forms an undercut angle ($\beta$) with the guide rail top side which is greater than a sharp angle ($\alpha$) formed between the center section and the respective edge section of the cover band.

5. A linear motion guide according to claim 4, wherein the undercut angle ($\beta$) is about 3° to 10° greater than the sharp angle ($\alpha$).

6. A linear motion guide according to claim 4, wherein the sharp angle ($\alpha$) is about 65° to 75°.

7. A linear motion guide according to claim 4, wherein a rounded edge is formed between the top side and each contact surface.

8. A linear motion guide, comprising:

a guide rail having a longitudinal direction, a top side and two side faces, each side face having an undercut in the transverse direction;

a slide substantially U-shaped in cross section;

a plurality of rolling elements provided on the slide for supporting the slide on the guide rail for movement longitudinally therealong;

at least one opening through the top side of the guide rail within the range of longitudinal movement of the slide for receipt of a fastening member to secure the guide rail to a support; and a cover band of hardened spring material, the cover band having a center section for covering the top side of the guide rail within the range of longitudinal movement of the slide and two edge sections parallel to the longitudinal direction of the guide rail and bent inward in the transverse direction for engagement with the side face undercuts of the guide rail.

9. A linear motion guide according to claim 8, wherein the cover band has a thickness within the range of about 0.1 mm to 0.2 mm.

10. A linear motion guide according to claim 9, wherein the cover band has a thickness of about 0.15 mm.

11. A linear motion guide comprising:

a guide rail having a longitudinal direction, a top side and two side faces, each side face having an undercut in the transverse direction;

a slide substantially U-shaped in cross section and provided with at least one lip seal for contact with the top side of the guide rail;

a plurality of rolling elements provided on the slide for supporting the slide on the guide rail for movement longitudinally therealong;

at least one opening through the top side of the guide rail within the range of longitudinal movement of the slide for receipt of a fastening member to secure the guide rail to a support;

a cover band of springy band material, the cover band having a center section for covering the top side of the guide rail within the range of longitudinal movement of the slide and two edge sections parallel to the longitudinal direction of the guide rail and bent inward in the transverse direction for engagement with the side face undercuts of the guide rail; and said cover band being contacted by said at least one lip seal during longitudinal movement of the slide.

* * * * *